United States Patent [19]
Griess

[11] Patent Number: 4,958,144
[45] Date of Patent: * Sep. 18, 1990

[54] WATER-FLOW DETECTOR

[75] Inventor: Herbert C. Griess, Lincoln, Nebr.

[73] Assignee: Pittway Corporation, Northbrook, Ill.

[*] Notice: The portion of the term of this patent subsequent to Dec. 13, 2005 has been disclaimed.

[21] Appl. No.: 178,018

[22] Filed: Apr. 15, 1988

Related U.S. Application Data

[63] Continuation of Ser. No. 787,311, Oct. 15, 1985, Pat. No. 4,791,414.

[51] Int. Cl.$^5$ .............................................. G08B 21/00
[52] U.S. Cl. .................................... 340/606; 340/610
[58] Field of Search ................ 250/356.1, 229, 331 R; 340/606, 607, 608, 609, 610, 611; 73/861.74, 861.75, 861.76; 200/81.9 R

[56] References Cited

U.S. PATENT DOCUMENTS

| | | | |
|---|---|---|---|
| 1,967,187 | 7/1934 | Bohner | 340/606 |
| 2,867,698 | 1/1959 | Gondolfo | 340/618 X |
| 3,284,788 | 11/1966 | Hudson | 340/527 |
| 3,641,819 | 2/1972 | Kendrick | 340/606 X |
| 3,814,935 | 6/1974 | Kissel | 340/606 X |
| 4,151,522 | 4/1979 | Yamauchi | 340/587 |
| 4,295,044 | 10/1981 | Anderson et al. | 73/861.75 X |
| 4,791,414 | 12/1988 | Griess | 340/606 |

FOREIGN PATENT DOCUMENTS 594721 3/1960 Canada.
024628A 1/1980 United Kingdom.

OTHER PUBLICATIONS

Notifier/Emhart Series WFD and WFD-10 Vane Type Water-Flow Indicator, Installation Instructions.

*Primary Examiner*—Joseph A. Orsino
*Assistant Examiner*—Jeffery A. Hofsass
*Attorney, Agent, or Firm*—Dressler, Goldsmith, Shore, Sutker & Milnamow

[57] ABSTRACT

A water-flow detector with an electronic time delay. There is a light-emitting diode and photo-transistor detector pair, a timer comprising an oscillator and a counter, and an alarm relay. The output of the photo-transistor is applied to the reset input of the counter, and the counter output is applied to the relay. The electronic assembly is positioned over the actutator arm of a paddle-type flow sensor assembly in such a way that movement of the arm by water-flow blocks the light path between the emitter and detector, which causes the photo-transistor output to go low, which releases the reset on the counter. The counter counts a predetermined time delay sufficient to avoid nuisance alarms due to temprary surges in the water conduit, and then activates the relay.

8 Claims, 3 Drawing Sheets

WATER-FLOW DETECTOR

This is a continuation of application Ser. No. 787,311, filed Oct. 15, 1985, now U.S. Pat. No. 4,791,414.

BACKGROUND OF THE INVENTION

1. Field of the Invention

The invention in general relates to the field of water-flow indicators that are intended to be mounted on a water-pipe of sprinkler-type fire suppressant systems to activate an alarm when water flows in the pipe. In particular, it relates to such water-flow indicators having a time delay function

2. Description of the Prior Art.

Water-flow detectors, sometimes referred to as water-flow indicators, which are mounted on the pipes of sprinkler-type fire suppressant systems are well-known. These systems generally include a paddle or vane which is placed within the pipe or other conduit carrying the water. The vane is connected to a pivot arm which connects to an alarm actuator. A problem with such water-flow detectors is that transient flows can occur in the sprinkler system pipes; for example, when a pump that maintains pressure in the system turns on, air trapped in the system will be compressed, which may cause water to temporarily surge past the flow detector location. Such temporary surges can trigger false alarms which are a nuisance. The common way to avoid such nuisance alarms is to provide a time delay between the beginning of the flow and signaling an alarm. Typically, an adjustable pneumatic dashpot (similar to that of a screen door closer) retard mechanism is used to provide the delay.

The prior art delay mechanisms have a number of disadvantages. The pneumatic retard is vulnerable to air borne particles which can clog the miniscule exhaust path and significantly alter the delay or even prevent the actuation of the alarm. The mechanical linkages can vary or deteriorate to cause significant variation in the force required to actuate the mechanism, thus altering the flow sensitivity of the detector. Further, setting the pneumatic retard time delay involves a time-consuming trial-and-error method since absolute calibration is difficult with such retards.

SUMMARY OF THE INVENTION

It is an object of the invention to provide a water-flow detector which overcomes one or more of the disadvantages of the prior art detectors.

A related object is to provide a water-flow detector having an electronic time delay function.

A further object of the invention is to provide a water-flow detector having a number of predetermined time delays which can be easily selected.

Another object of the invention is to provide a water-flow detector which upon failure of the system or parts of the system will provide either an immediate alarm or an alarm with no, or minimal, delay when flow is detected.

Accordingly, the invention provides a source of radiation, radiation detector means for producing an electrical output related to the radiation incident upon it, means responsive to the water-flow for intercepting at least a portion of the radiation passing from the radiation source to the detector, and a means responsive to the electrical output of the detector for providing an indication of water-flow after a delay sufficient to avoid nuisance alarms due to transient flow conditions. In the preferred embodiment, the delay is for a predetermined time. Preferably there is a switch for selecting one of several predetermined delay times. Preferably the delay is provided by a circuit including an oscillator and a counter. Preferably there is a means for stopping the oscillator when the indication of water flow is provided. Preferably there is also a means for resetting the counter when the water flow ceases. In the preferred embodiment, the radiation source comprises a radiation-emitting diode and the radiation detector means comprises a photo-transistor.

The water-flow detector provided by the invention is less expensive and more reliable than prior art detectors in addition to meeting the objectives outlined above. Numerous other features, objects, and advantages of the invention will become apparent from the following detailed description when read in conjunction with the accompanying drawings.

DESCRIPTION OF THE PREFERRED EMBODIMENT

Figure 1:
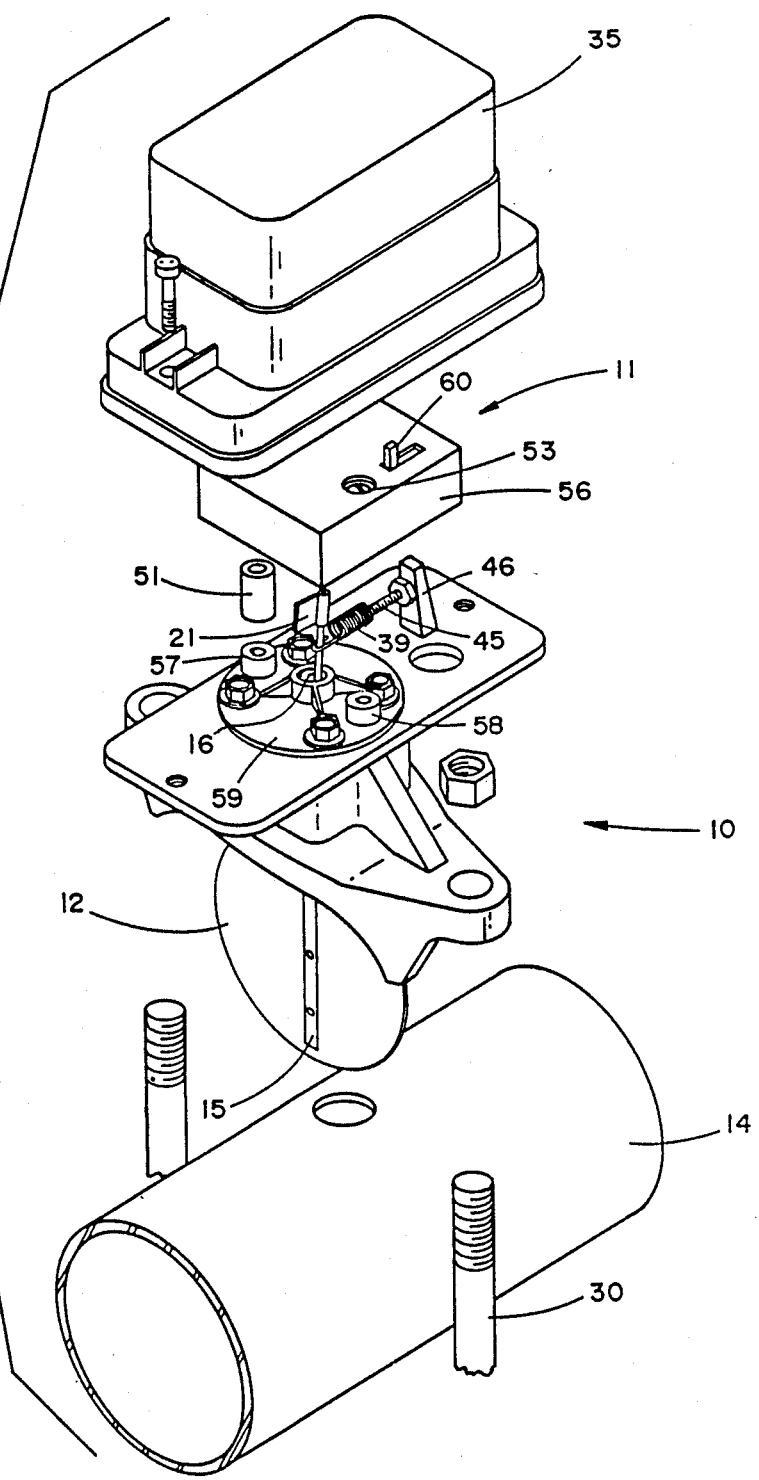
FIG. 1 is an exploded view of a water-flow detector according to the invention.
Figure 2:
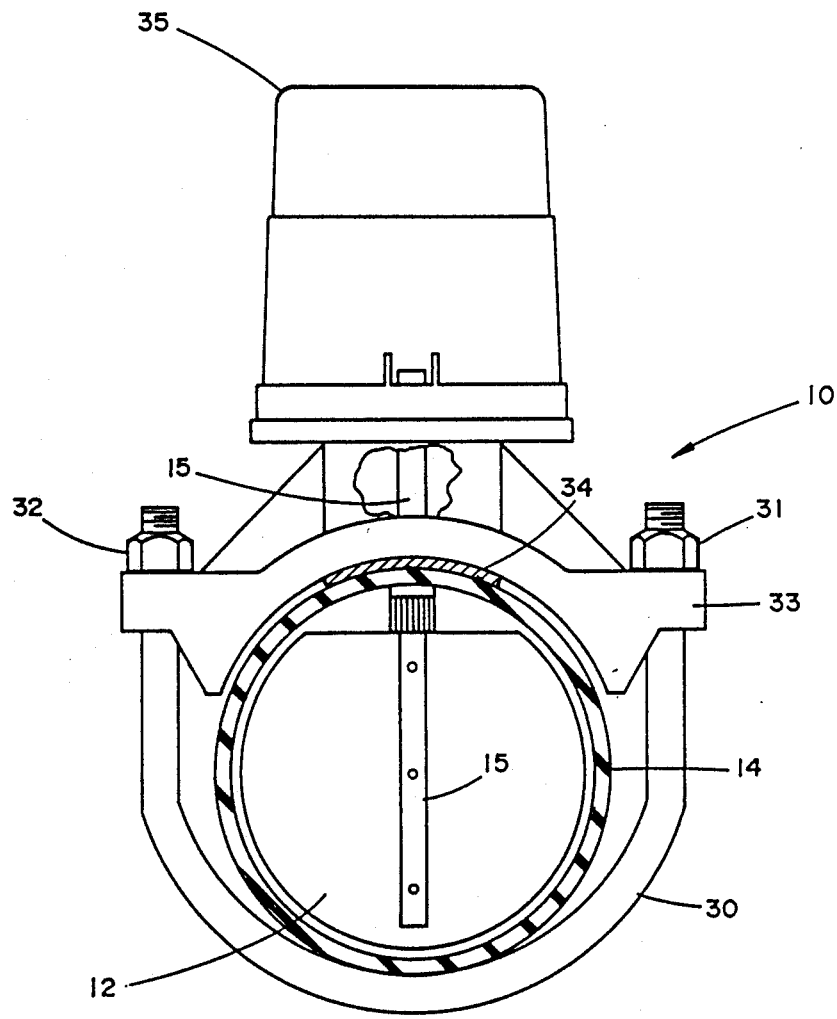
FIG. 2 is an end view of the detector of FIG. 1 installed in a water pipe.

Directing attention to FIG. 1, an exploded view of the preferred embodiment of the water-flow detector according to the invention, is shown. While the invention will be described in connection with a preferred embodiment, it will be understood that it is not intended to limit the invention to that embodiment. The embodiment includes a mechanical assembly 10 and an electrical assembly 11. The mechanical assembly 10 includes a paddle (or vane) 12 that is intended to be inserted within a pipe 14 of a sprinkler-type fire suppressant system. The vane 12 is attached to an arm 15 which passes through a water seal 17 (FIG. 3) and is mounted on a pivot 18. An actuator member 21 is attached to the end 16 of the arm 15 opposite the vane 12. The electrical assembly 11 includes a radiation source 22 (FIGS. 3–5) a radiation detector 23, a timer 24 (FIG. 5) and a relay 25. The electrical assembly 11 is mounted on the mechanical assembly 10 so that actuator member 21 will move (see FIGS. 3 and 4) between radiation source 22 and radiation detector 23 when vane arm 15 pivots. Water flow in pipe 14 in a direction into the drawing of FIG. 2 causes the arm 15 to pivot and member 21 to move between source 22 and detector 23 (FIG. 4) to interrupt the radiation passing from source 22 to detector 23. This causes the electrical output of detector 23 to change which actuates timer 24 (FIG. 5) which counts for a selected delay time and then actuates relay 25 to provide an indication of the water flow. The relay 25 would generally be connected into a fire control panel (FACP) (not shown) and switching it may sound an alarm, flash annunciator lights showing where the flow is occurring, and/or send a signal to a central station where fire fighters would be alerted.

Turning now to a more detailed description of the preferred embodiment (and referring to FIGS. 1 and 2), the mechanical assembly 10 includes u-bolt 30, nuts 31 and 32, pipe saddle 33, gasket 34, vane 12, actuator arm 15, plate 59, actuator member 21, spring 39, screws 45 and support 46. A cover 35 encloses the top portion of the electrical assembly 11 and mechanical assembly 10. The details of the water seal 17 and pivot 18 are shown in the partially-exploded views of FIGS. 3 and 4. Pivot arm 18A is clamped between the under surface of seal 17 and the upper surface of ring 19, which is formed in the top portion of pipe saddle 33. Seal 17 comprises a rubber or rubber-like wafer 17A and a thin metal disk 17B. The flexibility of the seal wafer 17A permits the pivot 18 and arm 15 to move. Except for actuator member 21 and spring 39, the mechanical assembly 10 is conventional and thus only these parts will be discussed in further detail. For example, such assemblies are incorporated in the Series WFD and WFD-10 Vane-Type Water Flow Indicators available from Notifier Company, 3700 North 56th Street, Lincoln, Nebr. 68504.

Actuator member 21 preferably comprises a hollow cylindrical portion 40 and a rectangular portion 41. The cylindrical portion 40 has an inside diameter 42 that is smaller than the end of arm 15. The rectangular portion 41 is preferably approximately ¼ inch long by ½ inch high (along the direction of the axis of cylinder 40) and 1/16 inch thick. It is preferably molded in one piece of a resilient insulative material, such as rubber, silicon rubber, or a flexible plastic material. Cylinder 40 is forced over the end 16 of arm 15 and its elasticity holds it in place. Spring 39 is a coil spring similar to the return spring of the conventional devices referred to above, except that its spring constant is slightly less since it does not have to act against the dashpot to return the vane to normal. Spring 39 preferably includes a hook 38 on one end, which is hooked over arm 15 to connect it to the arm. Screw 45 is screwed into the other end of spring 39 to adjustably attach it to support 46 as in the conventional devices. Spring 39 and screw 45 are preferably made of stainless steel or other non-corrosive material.

Figure 3:
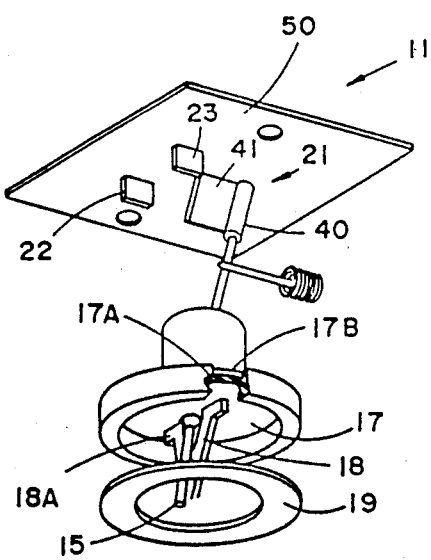
FIG. 3 is a perspective view of the mechanical to electrical transducer portion of the invention under normal (no flow) conditions.
Figure 4:
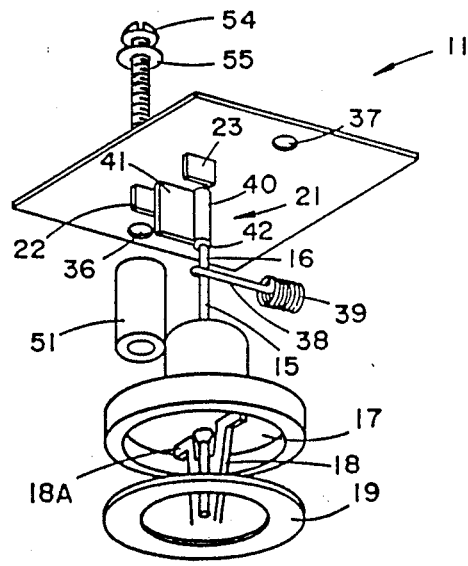
FIG. 4 is a perspective view of the portion of the invention shown in FIG. 3 under water-flow conditions.
Figure 5:
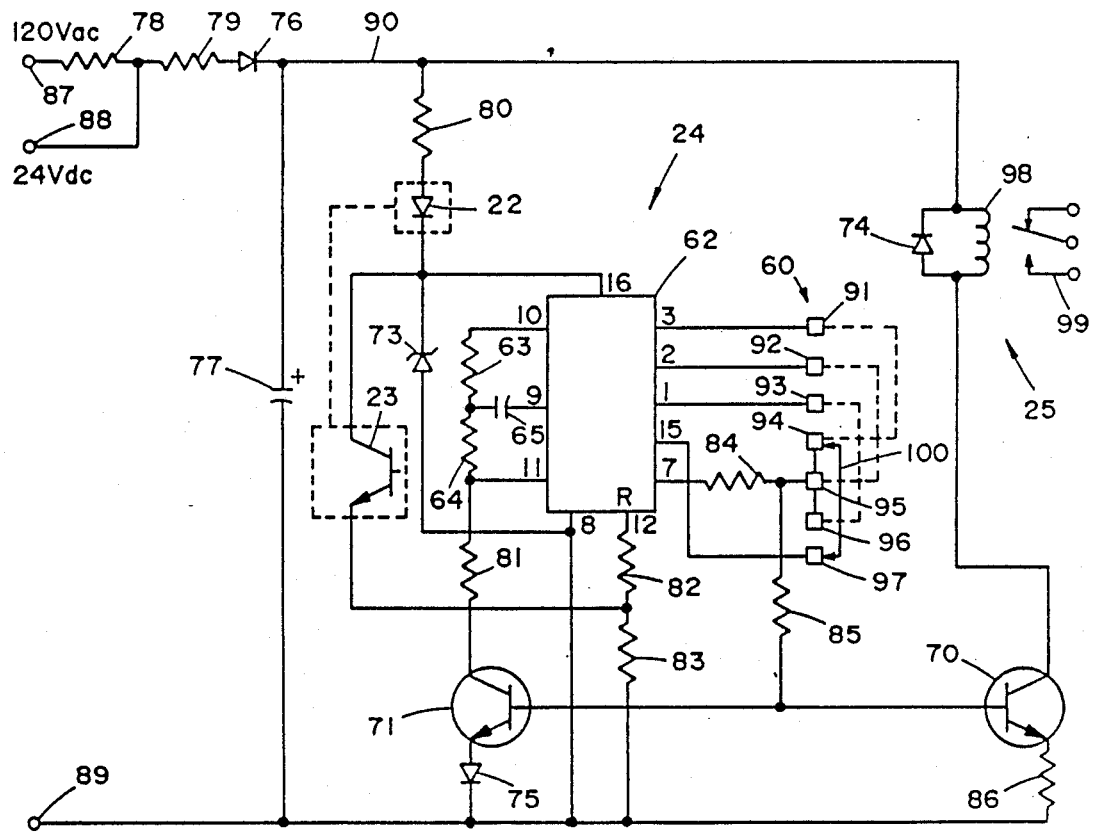
FIG. 5 is a detailed electrical circuit diagram of the electronic assembly portion of the invention.

Turning to FIGS. 3 and 4, the electrical assembly 11 includes circuit board 50, insulative cylinders, such as 51, screws 53 and 54, washers such as 55, source 22, detector 23 and switch 60 (FIG. 1), as well as other electrical parts which are shown in FIG. 5. For clarity, only the parts named above are shown in FIGS. 1, 3 and 4. Circuit board 50 is attached to supports 57 and 58 which are molded into the conventional support plate 59, by means of screws 53 and 54 and lock washers such as 55. In FIG. 4, screw 54, washer 55, and cylinder 51, are shown in exploded view in order to more clearly show their relationship. Screw 54 passes through hole 36 and cylinder 51 and screws into support 57. A similar screw 53 (FIG. 1) passes through a washer (not shown), hole 37 and another cylinder (not shown) and screws into support 58. The cylinders, such as 51, are preferably approximately ¾ inch long and ½ inch in diameter and act as spacers to separate circuit board 50 and plate 59. The source 22 and detector 23 are preferably attached to the circuit board by means of their leads (not shown) and are preferably spaced approximately ¼ inch apart on either side of the position of member 21 when arm 15 is fully pivoted due to water flow. Switch 60 is preferably placed so that it is easily accessible. Screws 53 and 54 and washers such as 55 are preferably made of stainless steel or other non-corrosive material, cylinders, such as 51, are made of teflon or other rigid insulative material, and circuit board 50 is made of conventional materials. The electrical assembly 11 is preferably enclosed in a case 56 which is open at the side facing plate 59 and is preferably made of fiber board, cardboard or other insulative material.

FIG. 5 shows the preferred electrical circuit according to the invention. It comprises radiation source 22, radiation detector means 23, timer 24 (which includes timer integrated circuit chip 62, resistors 63 and 64 and capacitor 65) relay 25, transistors 70 and 71, zener diode 73, diodes 74, 75 and 76, capacitor 77, and resistors 78 through 86. The numbers, such as 16, located next to the lines into chip 62 are the pin numbers of the chip. Resistors 78 and 79 are connected in series between the 120-volt AC "hot" input 87 and the anode of diode 76. The 24-volt DC input 88 connects between resistors 78 and 79. The cathode of diode 76 connects to the high circuit voltage line 90. Capacitor 77 is connected between the high voltage line 90 and the circuit common or ground 89. Resistor 80, and source 22 are connected in series between high line 90 and the number 16 pin (high voltage terminal) of timer chip 62. Zener diode 73 is connected between the number 16 pin and the number 8 pin (low voltage terminal) of timer 62. The number 8 pin is also connected to ground. The collector of detector 23 (which is preferably a photo-transistor) is connected to the number 16 pin of timer 62, while its emitter is connected to the number 12 pin (reset terminal) through resistor 82 and to ground through resistor 83. The dotted line between source 22 and detector 23 indicates that these components are physically placed so that radiation can flow from one to the other. The number 10 pin of timer 62 is connected to the number 11 pin through resistors 63 and 64. Capacitor 65 is connected between the number 9 pin of timer 62 and the line between resistors 63 and 64. The number 11 pin is also connected to the collector of transistor 71 through resistor 81. The emitter of transistor 71 is connected to ground through diode 75 with the cathode of the diode toward ground. The base of transistor 71 is connected to the base of transistor 70 and to pole 95 of switch 60. Pole 95 is also connected to pin 7 of timer 62 through resistor 84. Poles 91 through 93 of switch 60 are connected to the 3, 2, and 1 pins, respectively, of timer 62. Pole 97 is connected to the number 15 pin of timer 62. Poles 94 and 96 are connected to pole 95. Moveable contact 100 connects pole 94 to 97, and may be moved to connect poles 91, 92 and 93 to poles 94, 95 and 96, respectively, as shown by the dashed lines. The emitter of transistor 70 is connected to ground through resistor 86. The collector of transistor 70 is connected to one side of the coil 98 of relay 25. The other side of the coil 98 of relay 25 is connected to the high voltage line 90. Diode 74 is connected across coil 98. The switch 99 of relay 25 is connected to an alarm (not shown) or other device to signal that water flow has occurred.

Radiation source 22 is preferably an infrared emitting diode, such as the emitter half of a General Electric H23B1 emitter-detector pair. Detector 23 is preferably a photo-transistor, such as the detector half of the General Electric H23B1. Timer 62 is preferably a MC14060B available from Motorola Semiconductors and includes a 14-bit binary counter and an oscillator. Transistors 70 and 71 are preferably type 2N3643. Relay 74 is preferably a type T71L5D132-12 made by P&B (AMF). Switch 60 is a four-position switch with connections as shown. All diodes are preferably type 1N4004. Zener diode 73 is preferably a type 2N5232B (5.7 volt, ¼ watt). Capacitor 65 is preferably a 0.0047m farad capacitor, and capacitor 77 is 10m farad. Resistors 63 and 83 are 100K ohm, 91 and 84 are 10K ohm, 78 is a 1.75K ohm, 5 watt, 80 is 3.3K ohm, ¼ watt, 79 is a 100K ohm, ¼ watt, and 64, 82, 85 and 86 are 470K ohm, 47K ohm, 4.7K ohm, and 18 ohm, respectively.

The function of the components is as follows. Resistors 78 and 79 function as current limiting/voltage dropping resistors when the circuit is connected to 120 Vac. Resistor 79 performs the current limiting/voltage dropping function alone when operating on low voltage D.C. (18–32V F.W.R. or filtered). Diode 76 provides rectification on AC power and polarity reversal protection on D.C. Capacitor 77 provides filtering and transient absorption.

The series circuit comprised of resistor 80, source 22, and Zener diode 73 provides approximately 5.7 volts of ripple free DC across Zener diode 73 to operate timer 62. Resistor 80 limits the current through source 22. When operating from an initiating circuit of a fire alarm control panel (FACP), the current through this series string appears approximately as a 4.7K ohm end-of-line resistor. This current also causes source 22 to emit infrared light to illuminate photodarlington 23. Zener diode 73 also provides transient voltage protection for timer 62.

Photo-transistor 23 saturates when illuminated by source 22. This applies approximately 4.5 to 5 volts to the reset pin of timer 62 through current limiting resistor 82. The application of this "high" voltage to this pin holds the internal counter reset and inhibits the oscillator.

When the illumination from source 22 is blocked, photo-transistor 23 becomes cut-off from radiation. This causes the voltage at pin 12 to go "low" due to the pull-down resistor 83. This "low" appearing at pin 12 removes the reset from the counter and allows the oscillator to run. Timer 62 contains an onboard oscillator which uses resistors 63 and 64 and capacitor 65 as frequency determining components. The preferred frequency of oscillation is 91Hz which yields a period of 11 ms.

The counter contained in timer 62 is a 14 stage binary counter with several of the intermediate stage outputs available. The $2^{13}$ (pin 3), $2^{12}$ (pin 2), $2^{11}$ (pin 1), $2^9$ (pin 15) and $2^3$ (pin 7) outputs are wired to the delay selection switch 60. This provides the following time intervals: $2^{13} \times 11$ ms=90 sec; $2^{12} \times 11$ ms=45 sec; $2^{11} \times 11$ ms=22.5 sec; $2^9 \times 11$ ms=5.6 sec; and $2^3 \times 11$ ms=88 ms or approximately 0 sec. These outputs are normally "low" and go "high" when the counter reaches the count represented by the power of 2 shown.

Transistor 70, resistor 86, diode 75 and the base-emitter junction of transistor 71 forms a constant current source of approximately 30 mA. The use of a constant current source has two benefits: it allows relay 74 to operate over a large voltage range; and it provides a predictable and controlled current to activate the FACP initiating circuit.

The current source functions as follows. When the output of timer 62 that is selected by switch 60 goes "high", base current to transistor 70 flows through resistor 85. This allows collector current to flow through relay 25 and also resistor 86. Base drive is also provided to transistor 71 via resistor 85. When the collector current flowing in resistor 86 creates a voltage drop equal to the forward voltage drop across diode 75, any additional base current available through resistor 85 will be diverted into the base of transistor 71. The collector current of transistor 70 is therefore maintained at the current that will produce about 0.6V across resistor 86. Since resistor 86 is an 18 ohm resistor, this current level would be 0.6/18 or approximately 30 mA.

In addition to being part of the constant current source, transistor 71 provides another function. Upon receiving base current from resistor 85, transistor 71 will conduct to common pulling pin 11 of timer 62 "low". This causes the oscillator to stop and allows the counter to hold its count. With the counter suspended at the count that initiated the time out sequence, transistors 70 and 71 will be assured of a continuous supply of base current. This keeps relay 25 pulled in and the alarm current flowing.

When source 22 again illuminates detector 23, a reset signal will be presented to pin 12 of timer 62 resetting the counter. This causes the counter output that was previously "high" to go back "low", removing base drive from transistors 70 and 71 which releases relay 25 and restores normal "end-of-line" current.

Should switch 60, for some reason, not make contact, resistor 84 will provide base current for transistors 70 and 71 (via resistor 85) when the 2 output goes "high". This will happen 88 m sec after the reset is removed from pin 12. This causes an alarm to be transmitted substantially immediately upon flow detection. Normally, the junction of resistors 84 and 85 is held "low" by the output selected by switch 60 so that the "high-going" excursions of the 2 output are not seen by transistors 70 and 71.

Once a timing cycle has been initiated, but not completed, restoring illumination to detector 23 will reset the counter to zero as well as stop the timing process. This ensures that no residule count exists at the start of a new timing cycle thereby eliminating integration effects when presented with a series of short duration periods of flow.

Should the source 22 fail or the optics become coated with dirt, the alarm or other indication of water flow will be generated, thereby providing a fail-safe condition.

The water-flow detector according to the invention overcomes the problems of the prior art and at the same time is less expensive and more reliable. It has discrete time settings that require no trial and error adjustment. Timing accuracy is typically within +or−5%. There is no physical contact required between the flow sensing mechanism and the delay timer/alarm signaling circuitry. Additionally, the circuit has been designed in such a way that components affected by the environment will fail safe; i.e., their failure will result in either an alarm upon failure or an alarm with no delay when flow is detected.

A feature of the invention is that it provides the mechanical-to-electrical transducer at an earlier point in the system than previous water-flow detectors that were deemed to be reliable and safe enough to be used in fire alarm systems. The simplicity of the electronic circuit is one reason for its reliability. It is noted that a number of electronic components, such as source 22 and transistor 71, perform multiple functions and the action of detector 23 on the circuit is simple and direct. These factors permit the number of parts used to be minimized, reducing the chances of failure of the system.

A novel water-flow detector which provides an electronic time-delay function with sufficient reliability and fail-safe features to be used in a fire-alarm system has been described. It is evident that those skilled in the art may now make many uses and modifications of the specific embodiment described, without departing from the inventive concepts. For example, other equivalent electronic parts may be used. The mechanical system for responding to the water-flow may be modified. Indicator means other than a relay may be used. Consequently, the invention is to be construed as embracing each and every novel feature and novel combination of features present in the detection system described.

What is claimed is:

1. A water-flow detector for detecting a change from a no flow to a flow condition comprising:
    a source of radiation;
    radiation detector means for producing an electrical output related to the radiation incident upon it in a no flow condition;
    pivotable means responsive to said waterflow for interrupting at least a portion of said radiation passing from said radiation source to said detector means in a flow condition; and
    means responsive to said electrical output for generating an alarm signal indicative of a flow condition, said means including means for delaying generation of said signal for a sufficient time after said waterflow is detected to avoid nuisance alarms due to transient flow conditions and means for providing said indication upon failure of either said radiation source or said detector means in the no flow condition.

2. A water-flow detector as in claim 1, wherein said radiation source comprises a radiation-emitting diode and said radiation detector means comprises a phototransistor.

3. A water-flow detector as in claim 1 wherein said generating means includes an oscillator and a counter.

4. A water-flow detector as in claim 3 further including a means for turning off said oscillator upon provision of said indication.

5. A water-flow detector as in claim 1 wherein said means for providing said indication of said water-flow includes a relay which switches to provide said indication.

6. A water-flow detector as in claim 1 wherein said interrupting means includes a water vane interposed between said radiation source and said detector means.

7. A water-flow detector as in claim 6 including an arm connecting said vane and means for pivoting said arm.

8. An apparatus for detecting fluid flow comprising:
    support means;
    a source of radiant energy carried by said support means;
    means, carried by said support means for detecting radiant energy from said source and for generating an alarm blocking electrical signal responsive thereto in the absence of fluid flow;
    fluid flow detecting means, pivotably mounted on said support means for blocking, at least in part, radiant energy incident on said detecting means in response to a detected flow of fluid thereby altering said alarm blocking electrical signal;
    means carried by said support means for generating an alarm signal in response to said altered alarm blocking electrical signal;
    means carried by said support means for detecting a malfunction of said source in the absence of fluid flow and substantially immediately generating said alarm signal.

* * * * *